(12) United States Patent
Sang et al.

(10) Patent No.: US 12,413,512 B2
(45) Date of Patent: *Sep. 9, 2025

(54) APPLICATION TRAFFIC FLOW PREDICTION BASED ON MULTI-STAGE NETWORK TRAFFIC FLOW SCANNING

(71) Applicant: Palo Alto Networks, Inc., Santa Clara, CA (US)

(72) Inventors: Daphne Sang, Los Altos, CA (US); Harish Patil, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/772,081

(22) Filed: Jul. 12, 2024

(65) Prior Publication Data
US 2024/0372801 A1 Nov. 7, 2024

Related U.S. Application Data

(63) Continuation of application No. 17/819,708, filed on Aug. 15, 2022, now Pat. No. 12,068,950.
(Continued)

(51) Int. Cl.
*H04L 45/00* (2022.01)
*H04L 41/0894* (2022.01)
(Continued)

(52) U.S. Cl.
CPC .......... *H04L 45/38* (2013.01); *H04L 41/0894* (2022.05); *H04L 43/026* (2013.01);
(Continued)

(58) Field of Classification Search
None
See application file for complete search history.

(56) References Cited

U.S. PATENT DOCUMENTS

| | | | |
|---|---|---|---|
| 6,839,751 B1 | 1/2005 | Dietz et al. | |
| 7,742,406 B1 * | 6/2010 | Muppala | H04L 47/10 370/392 |

(Continued)

OTHER PUBLICATIONS

Kapoor et al., "RExACtor: Automatic Regular Expression Signature Generation for Stateless Packet Inspection", Nov. 23, 2021, IEEE, 2021 IEEE 20th International Symposium on Network Computing and Applications (NCA) (2021, pp. 1-9) (Year: 2021).*

(Continued)

*Primary Examiner* — Davoud A Zand
(74) *Attorney, Agent, or Firm* — Gilliam IP PLLC

(57) ABSTRACT

In a network control plane, a pattern matching database is built and maintained for identifying an application or application level protocol. In addition, pattern matching databases for predicting a subsequent flow for application layer/level protocols or data protocols are built and maintained. After flow differentiation in network traffic mirrored from a data plane, the network traffic flow is scanned in a first stage and then in a second stage if a signaling protocol message is detected in the first stage scan. For the second stage, one of the application/data protocol pattern databases is selected for scanning based on the signaling protocol message detected in the first stage scanning. If a match is found from the stage 2 scanning, a mapping between the signaling protocol identifier and an identifier for a predicted application traffic flow is created and communicated to the data plane for policy selection and enforcement.

20 Claims, 4 Drawing Sheets

Related U.S. Application Data

(60) Provisional application No. 63/367,029, filed on Jun. 24, 2022.

(51) Int. Cl.
*H04L 43/026* (2022.01)
*H04L 45/745* (2022.01)
*H04L 47/10* (2022.01)
*H04L 47/20* (2022.01)
*H04L 47/2483* (2022.01)

(52) U.S. Cl.
CPC ............ *H04L 45/745* (2013.01); *H04L 47/10* (2013.01); *H04L 47/20* (2013.01); *H04L 47/2483* (2013.01)

(56) References Cited

U.S. PATENT DOCUMENTS

| | | | |
|---|---|---|---|
| 2003/0229708 A1* | 12/2003 | Lie | .......................... H04L 47/10 709/230 |
| 2004/0199630 A1 | 10/2004 | Sarkissian et al. | |
| 2013/0117847 A1* | 5/2013 | Friedman | ................ H04L 43/16 709/201 |
| 2019/0102266 A1 | 4/2019 | Park et al. | |
| 2020/0045081 A1* | 2/2020 | Ritchey | ................... H04L 63/20 |
| 2023/0421488 A1 | 12/2023 | Sang et al. | |

OTHER PUBLICATIONS

PCT Application No. PCT/US2023/016575, International Search Report mailed Jul. 5, 2023, 3 pages.

PCT Application No. PCT/US2023/016575, International Written Opinion mailed Jul. 5, 2023, 6 pages.

Ehlert, et al., "Analysis and Signature of Skype VoIP Session Traffic", Fraunhofer FOKUS Technical Report NGNI-SKYPE-06b, Berlin, Germany, 2006, 13 pages.

Sang, et al., "Toward Automatic Mobile Application Fingerprint Extraction from Non-encrypted HTTP Traffic", 2020 IEEE Intl Conf on Parallel & Distributed Processing with Applications, Big Data & Cloud Computing, Sustainable Computing & Communications, Social Computing & Networking (ISPA/BDCloud/SocialCom/SustainCom), Dec. 2020, pp. 353-362.

* cited by examiner

APPLICATION TRAFFIC FLOW PREDICTION BASED ON MULTI-STAGE NETWORK TRAFFIC FLOW SCANNING

BACKGROUND

The disclosure generally relates to electronic communication (e.g., CPC Class H04 and digital transmission arrangements for network maintenance, administration, or management (e.g., subclass H04L 41/00).

Flow tracking inspects information in headers of packets (i.e., transport layer protocol data units) to classify packets of network traffic into different flows. A flow is identified with a tuple, which may be a 5- or 3-tuple. A 5-tuple for flow classification includes source Internet Protocol (IP) address, source Transmission Control Protocol (TCP)/User Datagram Protocol (UDP) port, destination IP address, destination TCP/UDP port, and IP protocol. A 3-tuple for flow classification would include source IP address, destination IP address, and IP protocol. After flow classification, a firewall can use stateful inspection to identify the application of a flow based on port and source/destination addresses. A firewall may also use deep packet inspection to identify an application based on an application signature/pattern in application data.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

Identifying an application layer protocol (e.g., session initiation protocol (SIP) or file transfer protocol (FTP)) or an application prior to application data beginning to flow across an inspection point (e.g., a firewall) allows for timely enforcement of a relevant policy and reduces the opportunity for a cyberattack. Some applications and application layer protocols rely on session establishment by a signaling protocol (e.g., SIP or H.323) before application traffic/data begins to flow. This description refers to an application layer/level protocol that often precedes data/application traffic as a "predictor protocol" since the subsequent flow of data or application traffic is expected or can be predicted. A security appliance (e.g., a firewall with an application level gateway) can use identification of a signaling protocol message establishing a session for an application or application layer protocol to determine flow identifying information to identify the application or application protocol before data begins streaming for the application or application layer protocol. In a network control plane, a pattern matching database is built and maintained for identifying an application or application level protocol (e.g., SIP, Hypertext Transfer Protocol (HTTP), etc.). In addition, pattern matching databases for predicting a subsequent flow for application layer/level protocols or data protocols are built and maintained. After flow differentiation in network traffic mirrored from a data plane, a process(es) in the control plane ("application identification engine") scans a flow in a first stage and then scans the traffic in a second stage if a predictor protocol message is detected in the first stage scan. For the second stage, the application identification engine selects one of the application/data protocol pattern databases for scanning based on the predictor protocol message detected in the first stage scanning. If a match is found from the stage 2 scanning, the application identification engine creates a mapping between the predictor protocol identifier and an identifier for a predicted application traffic flow.

Example Illustrations

Figure 1:
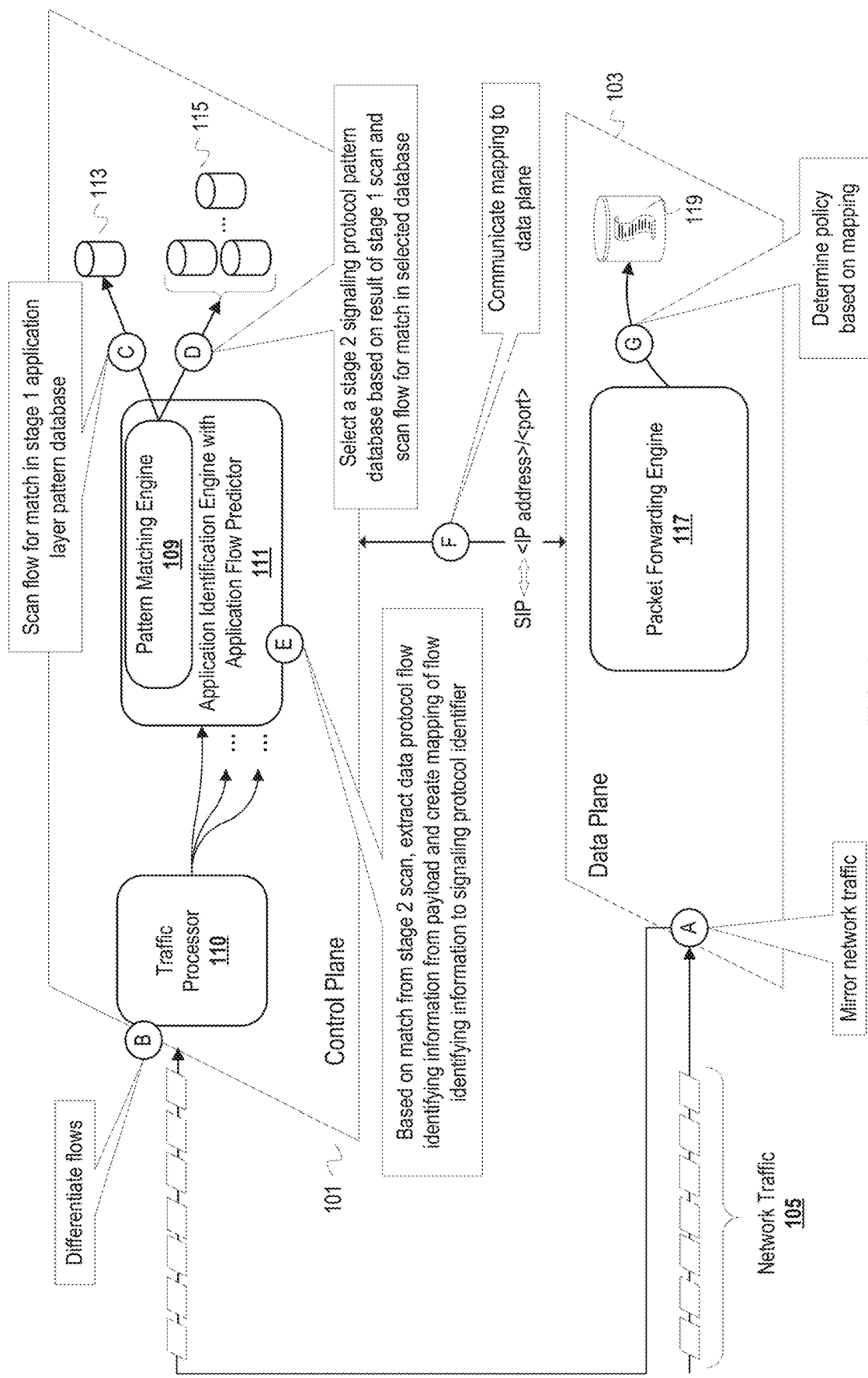
FIG. 1 is a diagram of a network device control plane using multi-stage pattern matching on network traffic for application flow prediction.

FIG. 1 is a diagram of a network device control plane using multi-stage pattern matching on network traffic for application flow prediction. FIG. 1 illustrates a control plane 101 and a data plane 103. The data plane 103 includes a packet forwarding engine 117. The control plane 101 includes an application identification engine 111 with an application flow predictor. The application identification engine 111 also includes a pattern matching engine 109. The control plane 101 also includes a traffic processor 110 that implements deep packet inspection (DPI) with flow tracking.

FIG. 1 is annotated with a series of letters A-G. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, network traffic received at the data plane 103 is mirrored to the control plane 101. The mirroring can be implemented with port mirroring.

At stage B, the traffic processor 110 differentiates the mirrored network traffic into detected traffic flows. For instance, the traffic processor 110 creates (or spawns a thread to create) a data structure with the detected network information tuples for flow differentiation.

For each flow, the application identification engine 111 scans the packets of the flow to identify an application or application level protocol in order to ensure a corresponding policy is applied.

At stage C, the application identification engine 111 scans the traffic flow using the pattern matching engine 109 for a match in a stage 1 application layer pattern database 113. In advance, the pattern matching database 113 and the pattern matching databases 115 are built. Expert/domain knowledge is used to select and define patterns or regular expressions based on fields of messages that represent applications, signaling protocols, etc. For the pattern matching databases 115, expert/domain knowledge is used to select and define patterns based on fields of messages that represent data protocols or applications. For this illustration, assume the stage 1 scanning yields a matching entry indicating a SIP message is detected in the transport layer packet payload or user data payload.

At stage D, the application identification engine 111 selects the one of the pattern matching databases 115 for SIP based on the stage 1 scanning result and scans the traffic flow accordingly. The application identification engine 111 scans the traffic flow using the pattern matching engine 109 (or another instance of the pattern matching engine 109) for a match in the selected SIP pattern matching database of the databases 115.

At stage E, the application identification engine 111 determines a data protocol indicated in the traffic flow and extracts flow identifying information of the data protocol from the matched packet payload, based on finding a pattern match in the selected stage 2 database. The matching entry can indicate location of flow identifying information in the matched payload with the SIP message. For example, the matching pattern may be for the Real-Time Protocol (RTP) indicated in a Session Description Protocol (SDP) message of the SIP message. The matching entry can indicate an offset within the SIP message to locate the network address (e.g., IP address) and port for the RTP connection that will be established and stream multimedia data. Below is an example of a SIP message with indications of the data protocol and flow identifying information for the data protocol. Lines within the SIP message with tokens that will match a pattern are marked with bold.

---

INVITE sip:bob@biloxi.example SIP/2.0
Via: SIP/2.0/UDP pc33.atlanta.example;branch=z9hG4bK776asdhds
Max-Forwards: 70
To: Bob <sip:bob@biloxi.example >
From: Alice <sip:alice@atlanta.example >;tag=1928301774
Call-ID: a84b4c76e66710@pc33.atlanta.example
CSeq: 314159 INVITE
Contact: <sip:alice@pc33.atlanta.example >
Content-Type: application/sdp
Content-Length: 142
v=0
o=Andrew 2890844526 2890844526 IN IP4 10.120.42.3
c=IN IP4 10.120.42.3
t=0 0
m=audio 49170 RTP/AVP 0 8 97
a=rtpmap:0 PCMU/8000
a=rtpmap:8 PCMA/8000
a=rtpmap:97 iLBC/8000
m=video 51372 RTP/AVP 31 34
a=rtpmap:31 H261/90000
a=rtpmap:34 H263/90000

---

The stage 1 scanning would have matched a pattern corresponding to "INVITE sip" and determine that the traffic flow included a SIP message. The stage 2 scanning would match multiple patterns within the SIP message, each of which corresponds to the data or application level protocol RTP. After SIP establishes the session(s), RTP will be used to deliver audio and video data streams. These are indicated with the m-lines. The matching patterns of this example would be "c=IN", "m=audio", and "m=video." The stage 2 scanning will find a match for "c=IN" in the SIP pattern database and the application identification engine will extract the network address 10.120.42.3 according to the match result, which could indicate location of the network address with an offset, for example. The extracted network address forms part of the flow identifier for the RTP application that will subsequently begin traversing the data plane 103 after the SIP session is established. The stage 2 scanning will find a match for "m=audio" in the SIP pattern database and the application identification engine will extract the port 49170 according to the match result. This port in combination with the extracted network address forms a flow identifier for the audio stream. The stage 2 scanning will also find a match for "m=video" in the SIP pattern database and the application identification engine will extract the port 51372 according to the match result. This port in combination with the extracted network address forms a flow identifier for the video stream. With the extracted flow identifying information for the expected/predicted data streams, the application identification engine will create a mapping between the signaling protocol and the flow identifying information. Referring again to the above example SIP message, the application identification engine will create two mappings. A first mapping will be "10.120.42.3:49170⇔SIP" for the predicted audio stream. A second mapping will be "10.120.42.3:51372⇔SIP" for the predicted video stream.

At stage F, the control plane 101 communicates the mapping(s) to the data plane 103. Assuming the matching pattern was found in the one of the databases 115 that represents SIP, the control plane 101 communicates a mapping of "sip" to an Internet Protocol (IP) address and a port, for example. The control plane 101 can communicate the mapping via an interprocess communication channel or inband interface.

At stage G, the packet forwarding engine 117 determines a policy to apply to the flow identified in the communicated mapping. The packet forwarding engine 117 accesses a repository (or structure) 119 that indicates policies assigned to applications and/or data protocols. The packet forwarding engine 117 accesses the repository 119 with the application or protocol identifier communicated from the control plane 101 to determine a configured or assigned policy. The packet forwarding engine 117 then updates a memory or structure of the data plane 103 to indicate the determined policy for enforcement on the flow identified in the communicated mapping.

Figure 2:
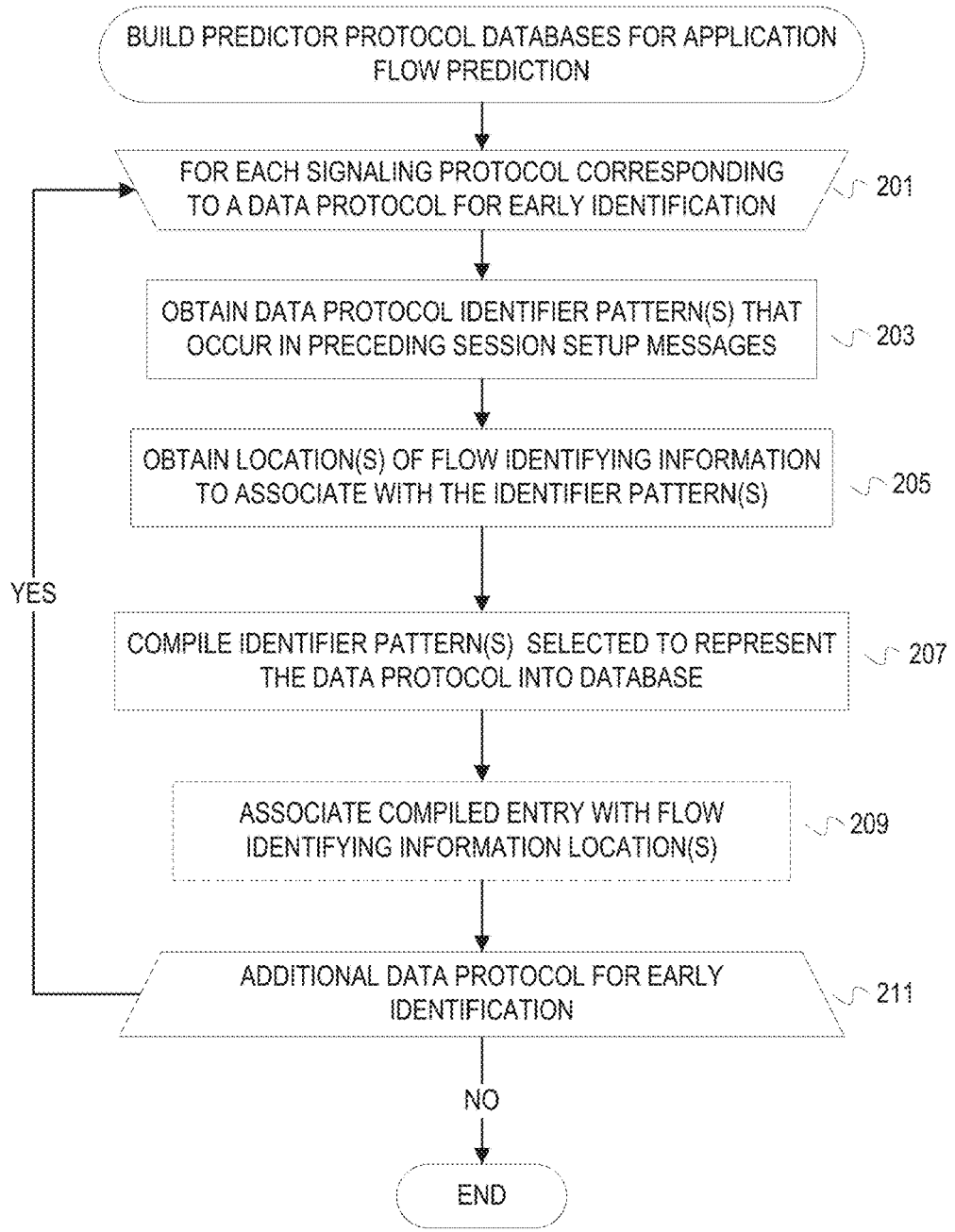
FIG. 2 is a flowchart of example operations for building application/data protocol databases for multi-stage application flow prediction.
Figure 3:
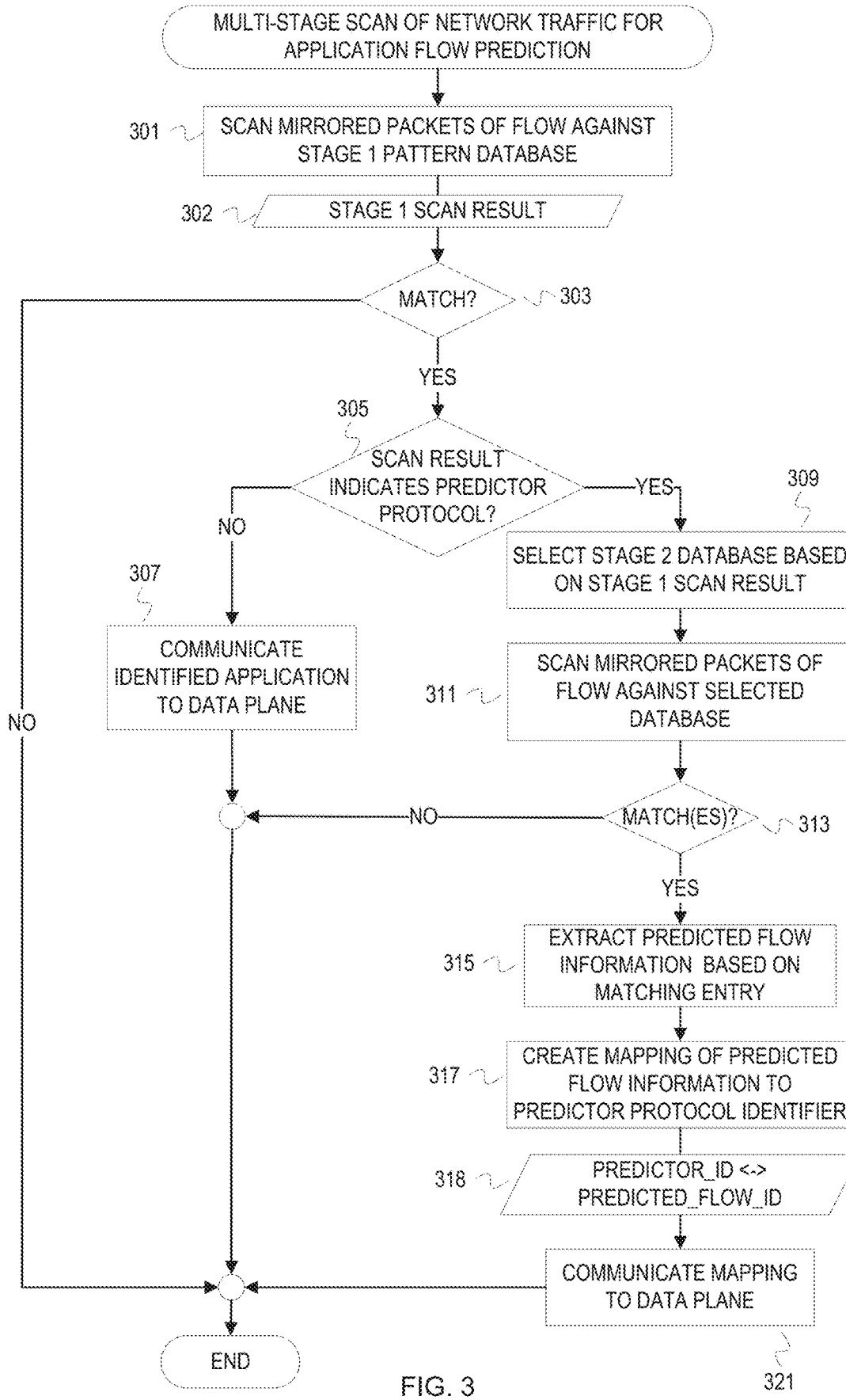
FIG. 3 is a flowchart of example operations for multi-stage scanning of network traffic for application flow prediction.

FIGS. 2-3 are flowcharts of example operations related to the multi-stage prediction of an application/data protocol flow that follows detection of a message of a supporting and/or preceding protocol, such as a signaling protocol setup message. While the preceding figure refers to an application identification engine, the example operations are described with reference to an application flow predictor which can be a component of an application identification engine or a separate program that interacts with or supplements the application identification engine. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for building application/data protocol databases for multi-stage application flow prediction. While at least some of the databases will be built in advance, others for different application/data protocols can be added later. In addition, database maintenance can involve adding, removing, and/or editing entries, each of which associates information for flow identifying information extraction with a pattern.

At block 201, the application flow predictor begins operations for building pattern matching databases for application/data protocols that expected or predicted to follow session establishment by a signaling protocol. For example, the application flow predictor may build a regex matching database for each application/data protocol.

At block 203, the application flow predictor obtains application/data protocol identifier patterns that occur in preceding session setup messages. For example, the application flow predictor can iterate over files/structures containing regular expressions for a multi-channel application layer gateway (ALG) protocol (e.g., SIP, file transfer protocol (FTP), a H.323 protocol). The application flow predictor can process each of these files/structures in parallel or sequence.

At block 205, the application flow predictor obtains location(s) of flow identifying information to associate with the identifier patterns. In the case of SIP, the network address follows a matching c line pattern and ports follow matching m line patterns. The obtained location may be indicated or represented with an offset from a beginning of a payload/message or with respect to the matched pattern.

At block 207, the application flow predictor compiles the identified pattern(s) selected to represent the application/data protocol into the database. For instance, the application flow predictor compiles regular expressions of the application/data protocol into a regex matching database. Compilation depends upon the regex matching engine implementation being used. For instance, compilation functions of the Hyperscan library can be used to compile regular expressions selected for the application/data protocol. For a SIP pattern database, c-line and m-line tokens from SDP payloads can be used to predict media flows (e.g., audio/video, RTP/AVP). As another example, patterns can be based on FTP port commands. Below are example SIP patterns defined with wildcards that can be compiled into a regex database for application/data protocols expected/predicted to follow a SIP session setup.

| | |
|---|---|
| TOK_IP4: | "/.*IN IP4 /i", |
| TOK_M_AUDIO: | "/.*\\nm=audio /im", |
| TOK_M_VIDEO: | "/.*\\nm=video /im", |
| TOK_RTP_AVP: | "/.*RTP\\/AVP /i", |
| TOK_RTP_SAVP: | "/.*RTP\\/SAVP /i", |
| TOK_RTP_AVPF: | "/.*RTP\\/AVPF /i", |
| TOK_RTP_SAVPF: | "/.*RTP\\/SAVPF /i", |
| TOK_M_APP: | "/.*\\nm=(application|image) /im", |

At block 209, the application flow predictor associates the obtained flow identifying information location(s) with the compiled pattern in the corresponding database entry. The application flow predictor can update a pointer or field to indicate the location information. This is an optional operation since location information can be separately defined for each signaling protocol. For example, a match in the SIP pattern matching database causes the application flow predictor to lookup location information based on finding a match instead of having the location information in the database.

At block 211, the application flow predictor determines whether there are patterns for an additional application/data protocol for flow prediction. If so, operational flow returns to block 201. Otherwise, operational flow ends.

FIG. 3 is a flowchart of example operations for multi-stage scanning of network traffic for application flow prediction. The example operations run after flow differentiation of network traffic mirrored from a data plane. Thus, the scanning is of an individual flow. A different thread can be instantiated for each flow to be scanned, depending upon implementation.

At block 301, an application identification engine scans mirrored packets of a traffic flow against a stage 1 pattern database. For example, the Hyperscan library in scan mode can be used to scan the payloads of the packets in the flow. The scan generates a stage 1 scan result 302.

At block 303, the application identification engine determines whether the stage 1 scan result 302 indicates a match in the stage 1 pattern database. If the stage 1 scan result is negative for a match, then the operational flow ends. In some cases, a default policy will be indicated for the scanned flow. If the stage 1 scan result indicates a match, then operational flow proceeds to block 305.

At block 305, the application identification engine determines whether the stage 1 scan result indicates a match for a "predictor" protocol. A predictor protocol being an application level protocol (i.e., above the transport layer) for which a conforming message will indicate in advance another application level protocol, likely because the predictor protocol is establishing a session or control information for a follow-on application/data protocol. The frequently used example of a predictor protocol in this description is SIP. The stage 1 scan result will include an identifier based on the match (e.g., "SIP" or "H.323"). The predictor protocol is not necessarily different than the protocol for the subsequent data flow. For instance, the FTP will establish a control connection and then a data connection. An FTP process will use the control connection to communicate a command(s). To illustrate, a pattern match for detecting FTP in a traffic flow as a predictor protocol will match a FTP command or response code based pattern (e.g., USER, RETR, CDUP, CWD, XRCP, XRMD, 220, 227, 332, 421, etc.). If a predictor protocol is not indicated, then operational flow proceeds to block 307. If a predictor protocol is indicated in the stage 1 scan result, then operational flow proceeds to block 309 for stage 2 scanning.

At block 307, the application identification engine communicates the identified application to the data plane. Although the application traffic corresponding to the identified application has likely already begun to flow across the inspection point, the data plane can start enforcing a relevant policy. Operational flow ends after block 307.

At block 309, the application flow predictor of the application identification engine selects a stage 2 database based on the stage 1 scan result. For example, predictor protocol pattern matching databases are indexed or identified by the values that would be returned from a matching entry in the stage 1 pattern matching database.

At block 311, the application flow predictor scans the mirrored packets of the traffic flow in which the predictor protocol message was detected for a match in the selected predictor protocol database.

At block 313, the application flow predictor determines whether a match(es) is found in the selected database. If not, then operational flow ends. For instance, the scanning for multiple patterns in parallel may return a match indication or set of match indications. Using FTP as an example, after stage 1 scanning detects a FTP port command message "227 Entering Passive Mode" which will communicate address and port that the FTP server will use for the data transfer the stage 2 scanning will find the patterns associated with the flow identifying information. If a match is found, then operational flow proceeds to block 315.

At block 315, the application flow predictor extracts the predicted flow information based on the matching entry. The match(es) in the selected predictor protocol database predicts at least one subsequent flow (e.g., an RTP flow for an audio stream after the SIP setup) will begin to traverse the inspection point. The matching entry can indicate location of the flow information (e.g., locations of network address and port) within the predictor protocol message. Embodiments may separately indicate location of flow information based on a match in a predictor protocol database. For example, a match in the predictor protocol XYZ pattern matching database causes the application flow predictor to lookup the location information of network address and port in a separate table. A predictor protocol may allow for multiple flows to be indicated within a conforming message. For instance, a SIP message body can contain a SDP description for multiple flows with multiple connections and multiple media sessions. Again referring to an FTP example, the application flow predictor can extract the flow identifying information by forming network address and port with detected parts of a FTP port command message. With the command message formatted as PORT-COMMAND-CODE (I1,I2,I3,I4,p1,p2), the application flow predictor can form the network address with I1.I2.I3.I4 and the port as (p1*256)+p2. With a more specific example of detecting a port command message "227 Entering Passive Mode (192, 168,20,101,117,254)," the application flow predictor can form the network address 192.168.20.101 and compute the port as 30206.

At block 317, the application flow predictor creates a mapping 318 of predicted flow information to an identifier of the predictor protocol. The application flow predictor can use the predictor protocol identifier that was indicated in the stage 1 scan result. Using the FTP example above, the application flow predictor creates a mapping 192.168.20.101:30206<->FTP.

At block 321, the application flow predictor (or another process in the control plane of the inspection point) communicates the mapping to the data plane. This can be communicated with inter-process communication, via an interface between the control plane and data plane, etc.

Variations

While the description refers to detecting or identifying a signaling protocol message in a traffic flow before branching to stage 2 scanning, embodiments are not so limited. Signaling protocol was selected as a representative type of predictor protocol since it often precedes ALG application traffic. (e.g., a SIP message precedes a RTP audio stream).

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
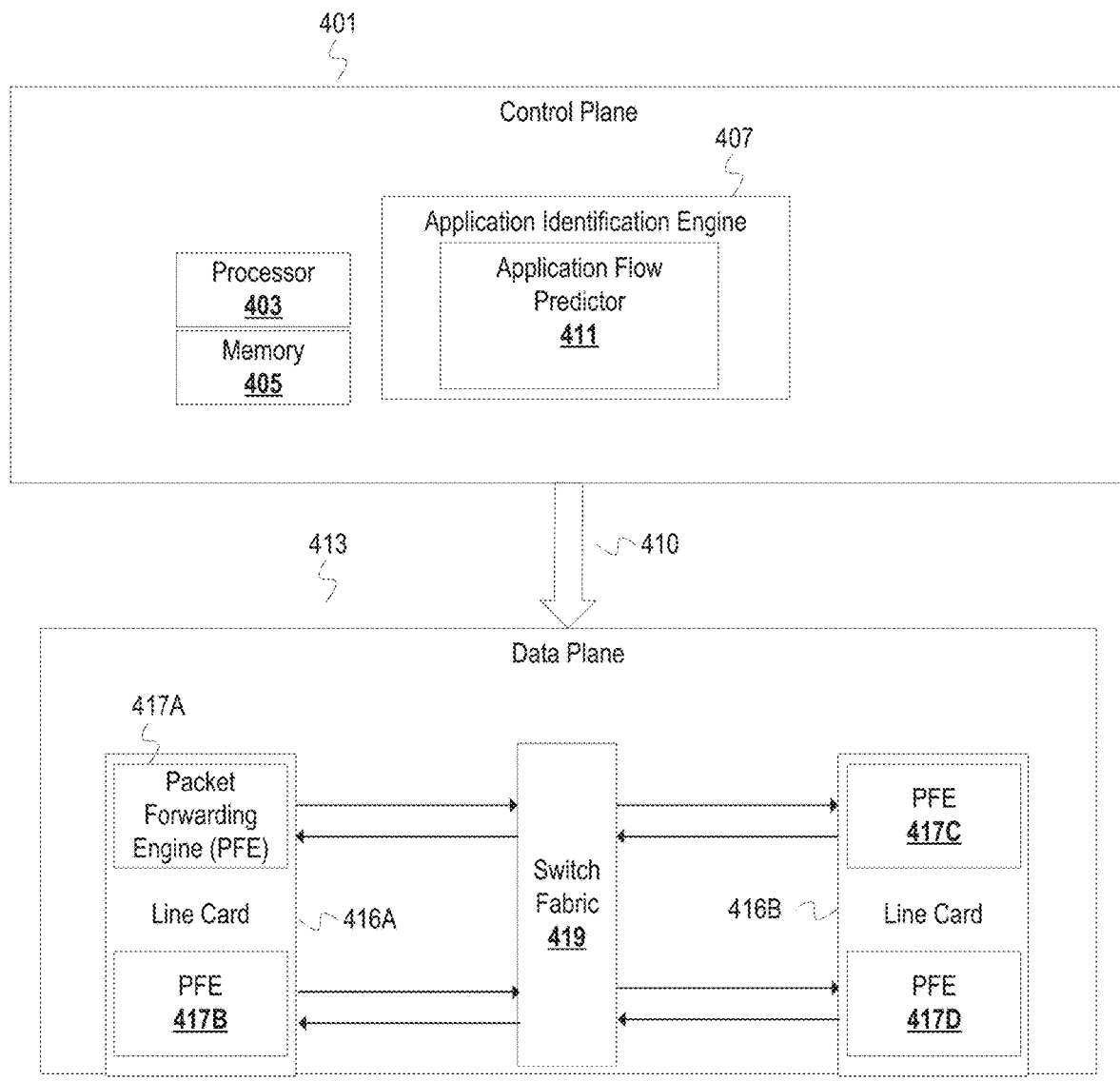
FIG. 4 depicts an example computer system with a data plane and a control plane that includes an application flow predictor.

FIG. 4 depicts an example computer system with a data plane and a control plane that includes an application flow predictor. The computer system includes a control plane 401 and a data plane 413. The control plane 401 includes a processor 403 (possibly including multiple processors, multiple cores, multiple nodes, and/or implementing multithreading, etc.). The computer system includes memory 405. The memory 405 may be system memory or any one or more of the above already described possible realizations of machine-readable media. The control plane 401 also includes an application identification engine 407 which includes an application flow predictor 411. The processor 403 may implement the application identification engine 411 (e.g., execute instructions of the program code). The application identification engine 407 may be an application specific integrated circuit that is coupled with the processor 403 but distinct from the processor 403. A communication channel 410 communicatively couples the control plane 401 to the data plane 413. The data plane 413 includes line cards 416A, 416B which communicate via a switch fabric 419. The line card 416A includes packet forwarding engines (PFEs) 417A, 417B. The line card 416B includes PFEs 417C, 417D. The application identification engine 407 differentiates network traffic mirrored from at least one of the PFEs 417A-417D and scans the differentiated flows against a primary database for application identification. If a predictor protocol message is detected in a flow from the application identification, the application flow predictor 411 scans the flow for pattern matches that predict a forthcoming traffic for an application/data protocol (e.g., a cloud-based conferencing application or protocol) and extracts predicted flow identifying information to create a mapping between the predictor protocol and the predicted flow. The control plane 401 then communicates the mapping to the appropriate PFE for policy selection and enforcement.

Embodiments are not limited to deployment in a network device with line cards as depicted in FIG. 4. Embodiments may be deployed as a virtual firewall or cloud-based firewall, for example.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
identifying a data protocol or application for a second network traffic flow expected to be subsequent to a first network traffic flow, wherein identifying the data protocol or application comprises,
based on identifying a first application level protocol for the first network traffic flow, selecting a pattern database of the first application level protocol;
based on matching a pattern in the first network traffic flow with an entry in the pattern database while scanning the first network traffic flow, extracting first traffic flow identifying information from the first network traffic flow according to the matching entry, wherein the matching entry indicates how to locate flow identifying information based on the matched pattern; and
associating an identifier of the first application level protocol with the first traffic flow identifying information; and
applying a policy indicated for the first application level protocol to the second network traffic flow based on the second network traffic flow being identified by the first traffic flow identifying information.

2. The method of claim 1, wherein the second network traffic flow expected to be subsequent to the first network traffic flow comprises the second network traffic flow expected to traverse a firewall subsequent to the first network traffic flow based on identifying the first application level protocol.

3. The method of claim 1, wherein the matching pattern is indicated in a payload of the first network traffic flow and the payload also indicates the first traffic flow identifying information.

4. The method of claim 1 further comprising identifying the first application level protocol for the first network traffic flow based on detecting a signature of the first application level protocol in the first network traffic flow while scanning the first network traffic flow against an application signature database.

5. The method of claim 1, wherein the first application level protocol is one of a plurality of signaling protocols, wherein selecting the pattern database comprises selecting the pattern database from a plurality of pattern databases corresponding to the plurality of signaling protocols.

6. The method of claim 1, further comprising detecting a message of the first application level protocol to establish a session or control information, wherein the first application level protocol is a signaling protocol.

7. The method of claim 1, wherein the first application level protocol is a multi-channel application layer gateway protocol.

8. The method of claim 1 further comprising building the pattern database with patterns from session description protocol descriptions in a message of the first application level protocol, wherein the first application level protocol is a signaling protocol.

9. One or more non-transitory, machine-readable medium having program code stored thereon, the program code comprising instructions to:
identify a data protocol or an application for a second network traffic flow expected to be subsequent to a first network traffic flow, wherein the instructions to identify the data protocol or application comprise instructions to,
based on identifying a first application level protocol for the first network traffic flow, select a pattern database of the first application level protocol;
based on matching a pattern in the first network traffic flow with an entry in the pattern database while scanning the first network traffic flow, extract first traffic flow identifying information from the first network traffic flow according to the matching entry which indicates how to locate flow identifying information based on the matched pattern; and
associate an identifier of the first application level protocol with the first traffic flow identifying information; and
apply a policy indicated for the first application level protocol to the second network traffic flow based on the second network traffic flow being identified by the first traffic flow identifying information.

10. The non-transitory, machine-readable medium of claim 9, wherein the second network traffic flow expected to be subsequent to the first network traffic flow comprises second network traffic flow expected to traverse a firewall subsequent to the first network traffic flow based on identifying the first application level protocol.

11. The non-transitory, machine-readable medium of claim 9, wherein the matching pattern is indicated in a payload of the first network traffic flow and the payload also indicates the first traffic flow identifying information.

12. The non-transitory, machine-readable medium of claim 9, wherein the program code further has stored thereon instructions to identify the first application level protocol for the first network traffic flow based on detection of a signature of the first application level protocol in the first network traffic flow while scanning the first network traffic flow against an application signature database.

13. The non-transitory, machine-readable medium of claim 9, wherein the first application level protocol is one of a plurality of signaling protocols, wherein selecting the pattern database comprises selecting the pattern database from a plurality of pattern databases corresponding to the plurality of signaling protocols.

14. The non-transitory, machine-readable medium of claim 9, wherein the program code further has stored thereon instructions to detect a message of the first application level protocol to establish a session or control information, wherein the first application level protocol is a signaling protocol.

15. The non-transitory, machine-readable medium of claim 9, wherein the first application level protocol is a multi-channel application layer gateway protocol.

16. The non-transitory, machine-readable medium of claim 9, wherein the program code further has stored thereon instructions to building the pattern database with patterns from session description protocol descriptions in a message of the first application level protocol, wherein the first application level protocol is a signaling protocol.

17. An apparatus comprising:
a processor; and
a machine-readable medium having instructions stored thereon that are executable by the processor to cause the apparatus to,
identify a data protocol or an application for a second network traffic flow expected to be subsequent to a first network traffic flow, wherein the instructions to identify the data protocol or application comprise instructions to,
    based on identifying a first application level protocol for the first network traffic flow, select a pattern database of the first application level protocol;
    based on matching a pattern in the first network traffic flow with an entry in the pattern database while scanning the first network traffic flow, extract first traffic flow identifying information from the first network traffic flow according to the matching entry which indicates how to locate flow identifying information based on the matched pattern; and
    associate an identifier of the first application level protocol with the first traffic flow identifying information; and
apply a policy indicated for the first application level protocol to the second network traffic flow based on the second network traffic flow being identified by the first traffic flow identifying information.

18. The apparatus of claim 17, wherein the matching pattern is indicated in a payload of the first network traffic flow and the payload also indicates the first traffic flow identifying information.

19. The apparatus of claim 17, wherein the first application level protocol is one of a plurality of signaling protocols, wherein selecting the pattern database comprises selecting the pattern database from a plurality of pattern databases corresponding to the plurality of signaling protocols.

20. The apparatus of claim 17, wherein the machine-readable medium further has stored thereon instructions executable by the processor to cause the apparatus to detect a message of the first application level protocol to establish a session or control information, wherein the first application level protocol is a signaling protocol.

* * * * *